US012793554B2

(12) United States Patent
Bernasconi et al.

(10) Patent No.: US 12,793,554 B2
(45) Date of Patent: Nov. 10, 2026

(54) DETECTION APPARATUS OF FLOATING BODIES ON SEA

(71) Applicant: SEESAFE INNOVATION S.R.L., Saronno (IT)

(72) Inventors: Giancarlo Bernasconi, Malnate (IT); Marta Calligaro, Gallarate (IT); Marco Compagnoni, Valfurva (IT); Marco Marcon, Bollate (IT)

(73) Assignee: SEESAFE INNOVATION S.R.L., Saronno (IT)

( * ) Notice: Subject to any disclaimer, the term of this patent is extended or adjusted under 35 U.S.C. 154(b) by 264 days.

(21) Appl. No.: 18/258,406

(22) PCT Filed: Dec. 20, 2021

(86) PCT No.: PCT/IB2021/062035

§ 371 (c)(1),
(2) Date: Jun. 20, 2023

(87) PCT Pub. No.: WO2022/137088

PCT Pub. Date: Jun. 30, 2022

(65) Prior Publication Data

US 2024/0304093 A1 Sep. 12, 2024

(30) Foreign Application Priority Data

Dec. 21, 2020 (IT) ........................ 102020000031574

(51) Int. Cl.
*B63B 49/00* (2006.01)
*B63B 79/15* (2020.01)
*G08G 3/00* (2006.01)

(52) U.S. Cl.
CPC ............... *G08G 3/00* (2013.01); *B63B 49/00* (2013.01); *B63B 79/15* (2020.01)

(58) Field of Classification Search
CPC . G08G 3/00; G08G 3/02; B63B 49/00; B63B 79/15; B63B 43/18
(Continued)

(56) References Cited

U.S. PATENT DOCUMENTS

2011/0128162 A1* 6/2011 Klepsvik ................. G01S 17/42 348/46
2016/0214534 A1* 7/2016 Richards ................ H04N 13/25
(Continued)

FOREIGN PATENT DOCUMENTS

CN 105867383 A * 8/2016 ............. G01D 21/02
CN 109990661 A 7/2019
(Continued)

OTHER PUBLICATIONS

C. D. Rodin and T. A. Johansen, "Detectability of Objects at the Sea Surface in Visible Light and Thermal Camera Images," 2018 Oceans—MTS/IEEE Kobe Techno-Oceans (OTO), Kobe, Japan, 2018, pp. 1-10, doi: 10.1109/OCEANSKOBE.2018.8559310. (Year: 2018).*

*Primary Examiner* — Abby J Flynn
*Assistant Examiner* — Leah N Miller
(74) *Attorney, Agent, or Firm* — FisherBroyles, LLP; Roger L. Browdy; Ronni S. Jillions

(57) ABSTRACT

A detection apparatus (10) of floating bodies (5) on sea is described; the apparatus comprises at least one thermal sensor (2) configured to receive a thermal signal (Sacq) of at least one sea area of interest (4), data processing means (3) adapted to process the signal emitted by said thermal sensor to detect whether or not there is a floating body in said area of interest depending on the temperature difference between the body and the sea water, and a device (1) adapted to emit
(Continued)

a pulsed laser beam to illuminate said area of interest to increase the temperature difference between the floating body and the sea water.

7 Claims, 3 Drawing Sheets

(58) Field of Classification Search
USPC ........................................................... 701/21
See application file for complete search history.

(56) References Cited

U.S. PATENT DOCUMENTS

| | | | | |
|---|---|---|---|---|
| 2016/0266247 | A1* | 9/2016 | Hjelmstad | G01S 17/89 |
| 2020/0025531 | A1* | 1/2020 | Jung | F41G 7/2293 |

FOREIGN PATENT DOCUMENTS

| | | | | | |
|---|---|---|---|---|---|
| CN | 110837255 | A | * | 2/2020 | G05D 1/0206 |
| EP | 2730946 | A1 | | 5/2014 | |
| GB | 2252398 | A | * | 8/1992 | F41G 3/00 |
| JP | 2009230190 | A | | 10/2009 | |
| JP | 2019064402 | A | * | 4/2019 | F41G 3/00 |
| WO | 0163335 | A2 | | 8/2001 | |
| WO | 2020099016 | A1 | | 5/2020 | |

* cited by examiner

DETECTION APPARATUS OF FLOATING BODIES ON SEA

The present invention relates to a detection apparatus of floating bodies on sea.

It is known in the prior art that the so-called Large Scale Marine Debris, or bodies adrift, are a serious threat to the safety of navigation, whether they are containers, lost loads, large logs or else.

In the specific case of containers, it is estimated that over 10,000 of the approximately 100 million containers which cross seas and oceans are lost every year. Several are the accidents which have been reported, which various times have caused boats to sink.

Each container is subject to a weight limit, thereby it is never completely filled and there is always some space inside where an air pocket is formed.

This causes that the containers, once fallen into the sea, do not sink immediately. Only when the water manages to penetrate therein, which is hindered by the almost complete water-tightness, they sink.

In many cases the devices on-board, such as radars or sonars, are not capable or sufficient to detect and provide a timely warning of the presence of floating objects, potentially dangerous for the hull of the vessel.

Furthermore, in case of night navigation or in conditions of poor visibility, such bodies may not be detected by the radars on-board due to the scarce surface of the emerged part. The boats are therefore forced to reduce the cruising speed thereof during night travel, keeping it below 10 knots so as to limit damage in case of a collision.

In addition to drifting bodies, oil spills or else, left by oil tankers or near oil platforms, may be present in the sea as floating bodies.

Other floating bodies may be animals or humans who survived ship accidents or the corpses of animals or humans.

In the light of the prior art, it is the object of the present invention to provide a detection apparatus of floating bodies on sea which is different from those known and which allows the detection of the body even in case of night navigation.

In accordance with the present invention, such an object is achieved by a detection apparatus of floating bodies on sea, said apparatus comprising at least one thermal sensor configured to receive a thermal signal of at least one sea area of interest, data processing means adapted to process the signal emitted by said thermal sensor to detect whether or not there is a floating body in said area of interest depending on the temperature difference between the body and the sea water, characterized in that it comprises a device adapted to emit a pulsed laser beam to illuminate said area of interest to increase the temperature difference between the floating body and the sea water.

By virtue of the present invention, it is possible to provide an apparatus which automatically detects the floating bodies placed at perceivable distances and which signals the presence thereof to an operator who will thus be capable of adopting the necessary measures, for example, in case of bodies adrift, the operator will adopt measures to correct the route of the boat in good time to avoid a collision.

The features and advantages of the present invention will become apparent from the following detailed description of a practical embodiment thereof, shown by way of non-limiting example in the accompanying drawings, in which.

Figure 1:
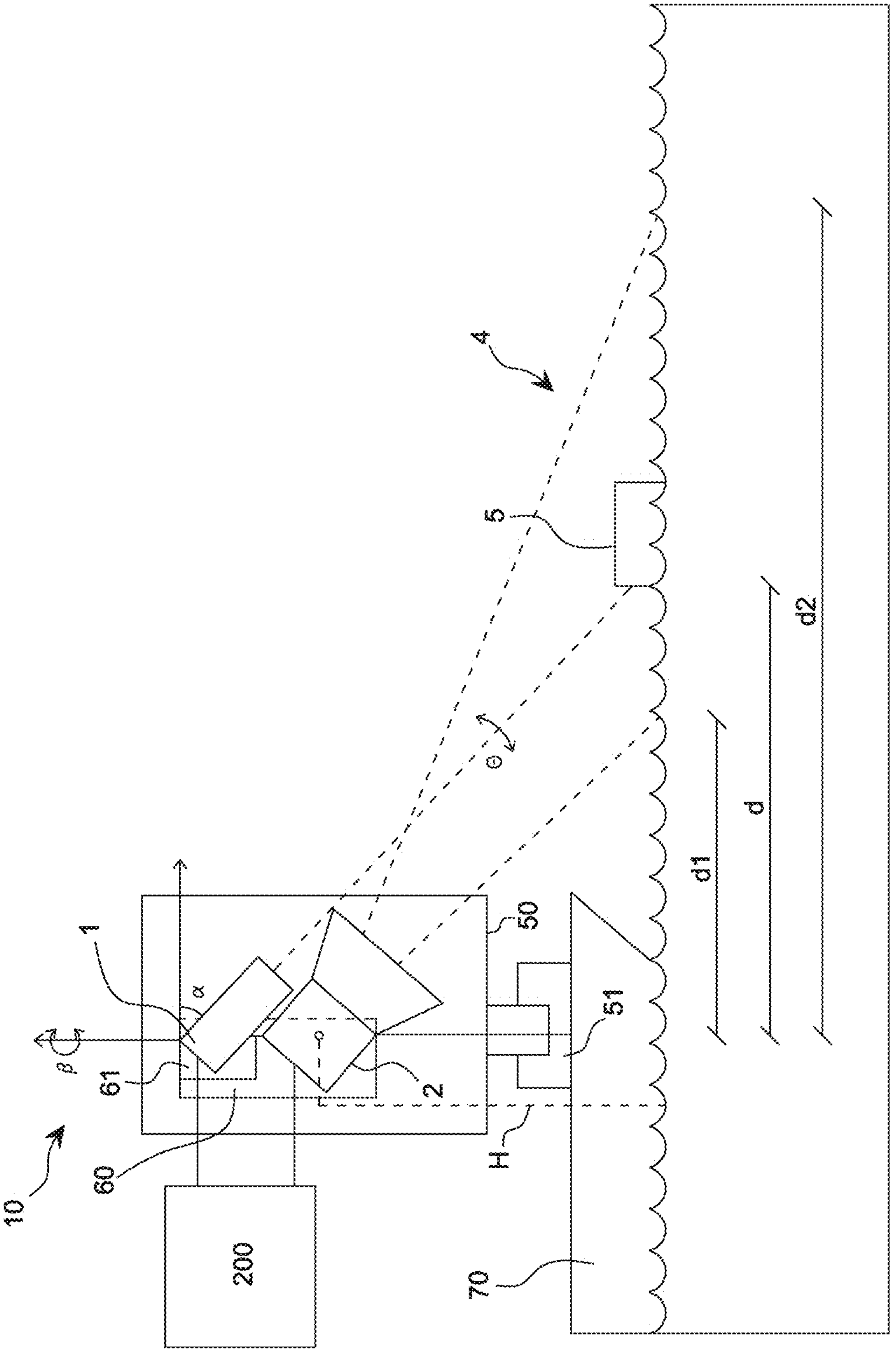
FIG. 1 is a diagram of the detection apparatus of floating bodies in accordance with the present invention.
Figure 2:
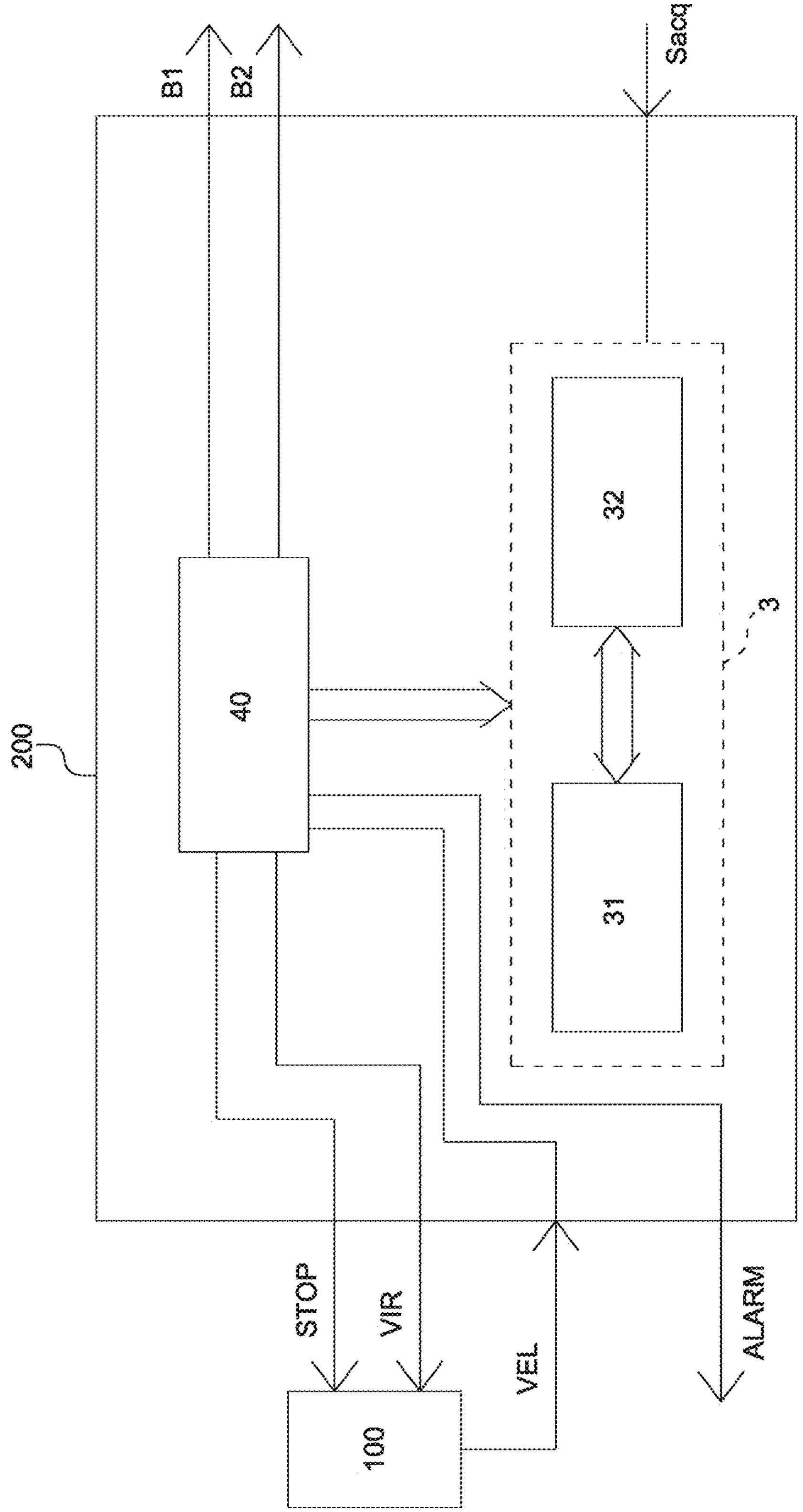
FIG. 2 is a diagram of a part of the apparatus in FIG. 1.

FIG. 1 shows the detection apparatus 10 of floating bodies on sea in accordance with the present invention. Said apparatus 10 comprises an actuator device 1 which illuminates a sea area of interest 4; in the case where said apparatus 10 is arranged in a boat 70, the actuator device 1 illuminates the area of interest surrounding the boat, in particular the area in front of the boat, to increase the temperature difference between a floating body 5 and the sea water.

The apparatus 10 comprises a thermal sensor 2 which acquires the information relating to the illuminated sea area, i.e., a thermal signal Sacq, and a data processing device 3 provided with a microprocessor 31 and a memory 32 in which software run, which are based on algorithms which analyze the signal Sacq acquired by the thermal sensor 2 to detect whether or not there is a floating body 5 in said area of interest depending on the temperature difference of the floating body 5 with the sea water. The data processing device 3 belongs to a control device 200.

Preferably, in the case where floating bodies are on sea, the apparatus may emit an acoustic or visual alarm signal ALARM; an operator, with the signal ALARM will thus be capable of adopting the necessary measures, for example, in case of bodies adrift, the operator will adopt measures to correct the route of the boat in good time to avoid a collision.

Alternatively, the apparatus may send a command VIR to the control unit 100 of the boat to command the boat to turn to avoid the object in good times or, in the case of high vessel speed, which leaves no room for a change of route, the apparatus may send an engine shutdown signal STOP to the control unit 100, thus increasing the time available for emergency maneuvers; the apparatus 10 continuously receives from the control unit 100 a signal Vel indicative of the speed of the boat and, depending on the distance D of the floating body, it sends the signal Vir or the signal STOP to the control unit 100.

In the preferred embodiment of the invention, the actuator 1 is a device adapted to emit a high-power collimated laser beam; the thermal sensor 2 is a thermographic camera or thermal camera, preferably provided with a telescopic lens which allows framing points at a great distance.

Unlike the already known solutions, the apparatus 10 minimizes the absorption of the waves by the water and remains efficient in case of attenuation due to the possible presence of mist, rain or fog. Furthermore, the technology used in the apparatus 10 allows the use thereof even in night contexts, since it is not dependent on the presence of sunlight.

The apparatus 10 is designed to be integrated into the navigation assistance apparatuses of pleasure craft, more particularly, pleasure boats or ships (such as, for example, yachts), with a hull length of approximately 20 m.

The hardware components of the system are installed and positioned on the boat so as to allow framing and analyzing the portion of sea of interest, based on the specifications and shape of the boat itself.

The operating principle of the apparatus 10 is described below.

The principle on which the system is based is that the objects to be identified, with respect to the water, have a much lower specific heat: this means that when they are heated the temperature thereof increases more than that of the water, causing them to be much more visible to an infrared sensor such as a thermal camera. Since the objects on sea have the same temperature as the water, a heat source is needed to cause the temperature increase. This source is identified in a laser device.

The laser beam of the device 1 is oriented so that the beam generated illuminates the portion of interest 4 of the area in front of the boat; if a floating body 5 is there, the temporary and partial heating of a portion of the body 5, equivalent to the size of the laser beam itself, will be produced. In the case where the area is free from objects, the beam will be absorbed by the water without generating a significant temperature variation, since, as already explained, the specific heat of the water is significantly greater with respect to that of possible objects.

The thermal camera 2, oriented integrally to the laser, will frame the portion of space illuminated thereby, acquiring a thermal image which will highlight the possible presence of points which are warmer with respect to the surrounding environment (usually, the objects heated by the laser). To allow the identification of objects at great distances, a telescopic lens is used as the lens of the thermal camera 2.

The apparatus 10 comprises a software, installed in the memory 32 of the data processing device 3, which acquires the thermal images and processes them with the aim of automatically identifying the presence of the floating bodies 5, without the need for human supervision. The software comprises a function which consists in removing possible thermal noise present in the image.

Another optional function of said software of the apparatus 10 is the possibility of distinguishing between different types of floating bodies 5, based on the different composition of the materials (based on the different thermal properties thereof). The apparatus 10 will be capable of sending, in case of the identification of a floating body 5, an alarm signal ALARM to the operator.

Furthermore, knowing the position and orientation of the components of the apparatus 10, it is possible to estimate the position of the detected floating body 5, based on the position thereof in the images acquired, and whether it is approaching or moving away, based on the simultaneous analysis of the image flow; this is always carried out by the software installed in the memory 32 of the data processing device 3.

The apparatus 10 is preferably accommodated in a protective structure 50 to prevent atmospheric agents from damaging the equipment, thus compromising the performance of the system itself.

The apparatus 10 is preferably supported by a tilting base 51 capable of compensating for the wave motion and the oscillations due to the engine of the vessel (a moving boat may oscillate strongly), to stabilize the observation point of the apparatus so as to focus on a specific point or area.

In addition, the apparatus 10 comprises means 60 adapted to carry out a panning of the actuator device 1 thermal camera 2 combination to allow the detection of objects placed laterally with respect to the main direction of the system.

The apparatus 10 also comprises means 61 adapted to carry out a tilting of the actuator device 1 alone, to illuminate the area of interest.

The classic case of use of the apparatus 10 consists in wanting to identify semi-submerged containers from a moving boat. It should be considered that the container is placed at a distance from the boat between 200 m and 400 m, sufficient to allow time for applying maneuvers to correct the route.

Containers are the most common floating bodies 5 to be identified, and according to ISO specifications they are made of CORTEN steel and have dimensions of 6×2.4×2.9 [m] or 12×2.4×2.9 [m].

Preferably, to acquire the thermal image, a Short-Wave Infrared (SWIR) thermal camera is used, which is capable of receiving the portion of the electromagnetic spectrum sensitive to temperature variations and, at the same time, is capable of forming an image similar to that in the visible spectrum, therefore at higher resolution with respect to classic thermal images. With respect to thermal cameras which operate in the MWIR/LWIR bands, SWIR cameras are less sensitive to blackbody radiation—that naturally emitted by bodies—but, on the other hand, they are more sensitive to reflections, and in this they have a similar behavior to the cameras which operate in the visible. By illuminating a possible floating body 5 with the laser beam coming from the device 1, the thermal camera 2 will partially acquire the radiation emitted due to the heating of the body itself, and partially the reflected radiation in the case where the body is made of metal (container).

In order to allow the construction of a low-cost device, a linear thermal camera was decided to be used, with a resolution of 1×N (N conventionally is 512, 1024, 2048, with a constant total sensor area and a pixel size increasing as N decreases); the thermal camera 2 is oriented vertically so as to acquire a vertical strip of pixels which frames the portion of sea in front of the boat.

It is possible to determine the minimum d1 and maximum d2 distances framed by the thermal camera 2 once the height H above sea level at which the thermal camera is placed and the angle $\alpha_{rotv}$ of vertical rotation at which the thermal camera 2 is placed have been set. Similarly, by knowing the area of interest 4 the images of which are to be acquired—i.e., the range of distances d1-d2 in which the floating body 5 is to be identified—it is possible to obtain the height H at which to place the thermal camera 2 and the rotation angle $\alpha_{rotv}$ thereof.

By knowing the focal length f of the lens and the total height $H_s$ of the thermal camera 2, which may be calculated as $H_s$=N*hpixel, hpixel being the size of the single pixel of the sensor (generally, in the order of μm), it is possible to calculate the opening angle of the chamber as $$\alpha_{camera} = 2\arctan\left(H_s/(2*f)\right).$$

Once the opening angle $\alpha_{camera}$ has been obtained, it is possible to calculate the height H of the system with respect to the sea level by knowing the minimum and maximum distances, d1 and d2, which are linked by the relationship $$\alpha_{camera} = \arctan\left(d2/H\right) - \arctan\left(d1/H\right)$$

The angle at which the camera is to be rotated is finally given by:

$$\alpha_{rotv} = \pi 2/2 - \alpha/2 - \arctan\left(d1/H\right).$$

The system described so far allows the images to be acquired in a range of distances from the boat 70, by framing the area in front of it in the frontal direction only.

By providing the system with a mechanism which performs a rotation movement of the structure along the yaw angle, it will be possible to cover the lateral directions, and in particular the entire area of interest which corresponds to the width of the boat.

Defining w as the width of the boat, the maximum rotation angle to be covered is that corresponding to the minimum distance framed by the camera, d1, and may be calculated as β=∓arctan(w (2*d1)).

An alternative to the panning of the thermal camera 2 may be the use of a rectangular array of M×N pixels, rather than a linear one. In this case, only the movement of the laser would be required. Given the high costs of thermal cameras, which increase with the size of the sensor, this is a solution which must be weighed based on the specifications of each individual project.

As for the lens of the thermal camera, a focal length will be required sufficiently long to cover the entire area of interest, provided with a lens which does not absorb the wavelengths to which the camera is sensitive. A telescope of the Ritchey-Chretien type, connected to the thermal camera by means of suitable adapters, is a suitable instrument in both respects. It is clearly possible to use lenses with any focal length, not necessarily telescopic lenses, as long as the lens does not absorb the wavelengths in the SWIR range. Based on the range of distances which have to be covered, it will therefore be possible to select a lens with a focal length covering it.

The actuator device 1 which allows the heating of the area of interest 4 in hand is preferably a pulsed laser device, which therefore emits a single high-power laser beam for a very short period of time. The laser power required to sufficiently heat the floating body 5 is in the order of tens of Watts, preferably between 1 and 30 Watts, with pulses having a duration of a few tens of milliseconds, preferably between 5 and 50 milliseconds; this allows increasing the temperature of the floating body by an amount between 1 and 20 degrees Celsius. In particular, by using a laser power of 5 W for 20 milliseconds, a 5° C. increase of the floating body temperature is achieved.

The laser beam, with a diameter in the order of centimeters, will be oriented so as to hit a precise point on the water surface. Depending on the material of which the framed point is made, two scenarios may arise: if the beam hits the open sea, it will be absorbed by the water, without this causing a significant temperature increase; as a result, the thermal camera 2 will not detect any objects. In the case where, on the other hand, the floating body 5 is at that point, the area would undergo an instantaneous temperature increase of a few degrees centigrade, significant enough to be detected by the thermal sensor 2 while avoiding damaging the object itself.

Since the laser emits a collimated beam, which vertically does not cover an area but a point, it will be necessary to perform a tilting movement to illuminate the whole area covered by the opening of the linear camera. The angle of rotation about a horizontal axis is indicated as θ in FIG. 1.

The maximum rotation angle is that which allows the point to be illuminated at the minimum distance d1, and it may be calculated as:

$$\theta\max = \arctan(H/d1).$$

The minimum angle corresponds instead to the maximum distance to be covered, d2, and will be given by θ min=arctan(H/d2).

Furthermore, if lateral points are to be illuminated, even in the case of the laser source it is necessary to perform the panning movement, i.e., a rotation about a vertical axis, integral with that of the thermal camera 2 with the angle 3.

As already mentioned, considering that the boat is subject to the wave motion and to the vibrations caused by the engine, a structure is required which compensates for the movements thereof, stabilizing both the point in which the laser beam is projected as well as the framing of the thermal camera 2. For such a reason, the entire apparatus 10 is supported by a tilting base 51, which moves freely along the three axes while keeping the camera and laser view fixed: the instrument which performs this type of stabilization is a platform with 6 degrees of freedom (also called Stewart's platform).

The panning and tilting are actuated by respective devices 60 and 61 capable of rotating both the device 1 and the thermal camera 2 or the actuator device 1 alone, respectively; the devices 60 and 61 are controlled by means of control signals B12 and B1 by a control device 40 which exchanges data with the data processing device 3.

When a portion with a temperature higher with respect to the water is detected in the thermal image, it means that the presence of a floating body 5, to which said portion corresponds, has been detected. It is possible to estimate the distance of such a body 5 from the thermal camera 2, in particular from the boat 70 on which the thermal camera 2 is arranged, with the method described below and performed by the data processing device 3 by means of a special software installed in the memory 32.

Figure 3:
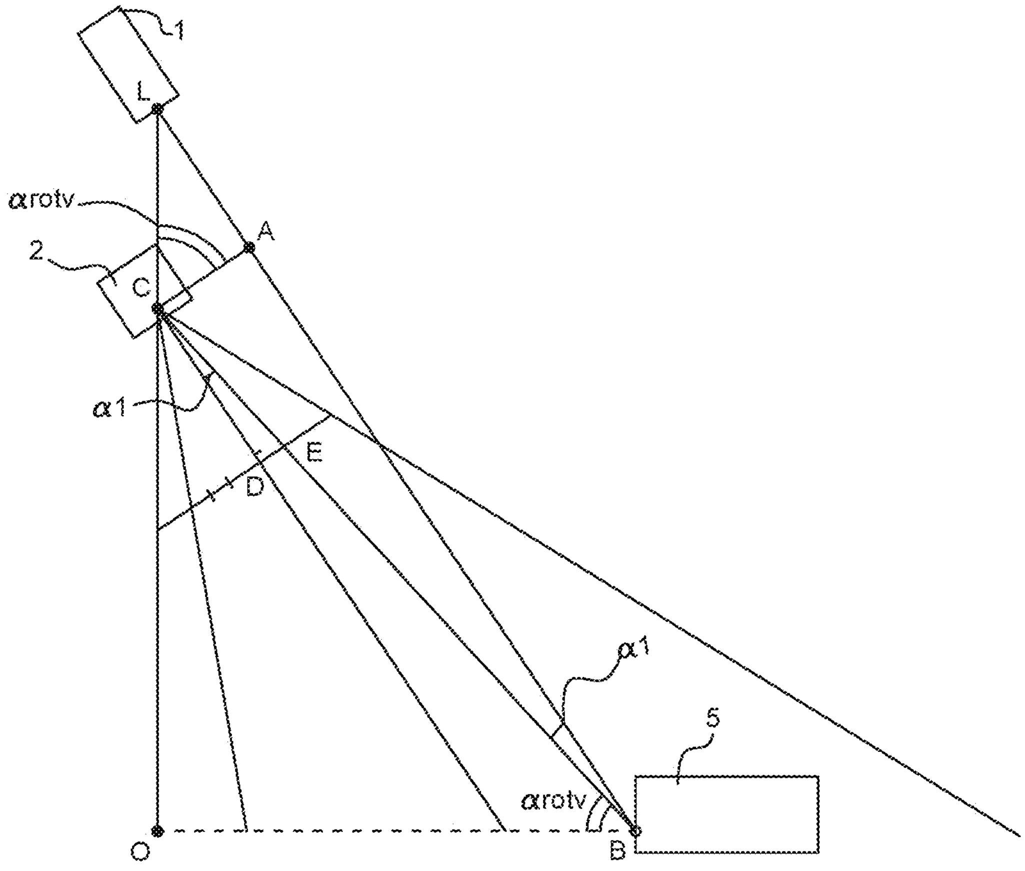
FIG. 3 is a diagram for determining the distance of a floating body from the thermal sensor.

With reference to FIG. 3, the laser of the actuator device 1 hits the point B, where there is a floating body 5. By tracing the segment CB, which joins B to the center of the thermal camera 2, the image plane is intersected at a point E which it is contained in one pixel. The distance between the boat and the floating body 5 is the length of the segment OB, which may be calculated as:

$$OB = CB * \cos\alpha_{rotv},$$

$\alpha_{rotv}$ being the vertical rotation angle of the thermal camera 2, known a priori. The length of CB is therefore left to be calculated. Given that:

CB=AB/cos $\alpha_1$, $\alpha_1$ being the angle between the segments CB and AB (and also between the segments CD and CE), by knowing the measurement of the segment AB it is possible to obtain CB.

It should now be observed that the angles marked with $\alpha_1$ have the same measurement, and both triangles with vertices ABC and DCE are rectangles: therefore, such triangles are also similar. This allows writing the relationship:

$$DE/AC = CD/AB,$$

from which $$AB = AC * CD/DE.$$

CD is the focal length of the thermal camera 2, known a priori.

DE may be calculated by knowing the index of the pixel in which the point is projected and the size of the single pixel (pixel size).

AC may be calculated as:

$$AC = LC * \cos \alpha_{rotv},$$

LC being the distance between the center C of the thermal camera 2 and the center L of the laser, known a priori through camera-laser calibration.

The invention claimed is:

1. A detection apparatus of floating bodies on sea, said apparatus comprising:

at least one thermal sensor configured to receive a thermal signal (Sacq) of at least one sea area of interest, a data processing device, comprising a microprocessor and a non-transitory memory storing software configured to be executed by the microprocessor, the software comprising instructions adapted to process a signal emitted by said at least one thermal sensor to detect whether or not there is a floating body in said at least one sea area of interest depending on the temperature difference between the floating body and the sea water, a pulsed laser adapted to emit a single laser beam, comprised between 1 and 30 watts, for a very short period of time, ranging 5 to 50 milliseconds to illuminate said at least one sea area of interest to increase the temperature difference between the floating body and the sea water, wherein said at least one thermal sensor is a thermal camera, wherein the detection apparatus is adapted to detect a floating body when a portion at temperature higher than the sea water is detected in the thermal image, wherein the portion corresponds to the floating body, and wherein said data processing device is configured to measure the distance between the detected floating body and the thermal camera based on the thermal image.

2. An apparatus according to claim 1, wherein the apparatus is configured to emit an alarm signal (ALARM) in case of the detection of a floating body on sea.

3. An apparatus according to claim 1, wherein the data processing device is adapted to determine the position (P) of the floating body with respect to the thermal camera.

4. An apparatus according to claim 1, wherein said thermal camera is a Short-Wave Infrared thermal camera comprising a telescopic lens.

5. An apparatus according to claim 1, wherein said apparatus is configured to be arranged on a boat and further comprises a tilting base to compensate for the movement of the boat.

6. A boat comprising the detection apparatus of floating bodies on sea according to claim 1.

7. A boat according to claim 6, further comprising a control unit for a navigation of the boat, said detection apparatus being adapted to emit a signal (VIR, STOP) to command said control unit to change a navigation route of the boat or to stop the boat according to the position (P) of a detected floating body with respect to the boat.

* * * * *